March 1, 1927.
E. RIEDINGER
1,619,542
BRAKE MECHANISM
Filed Dec. 29, 1924
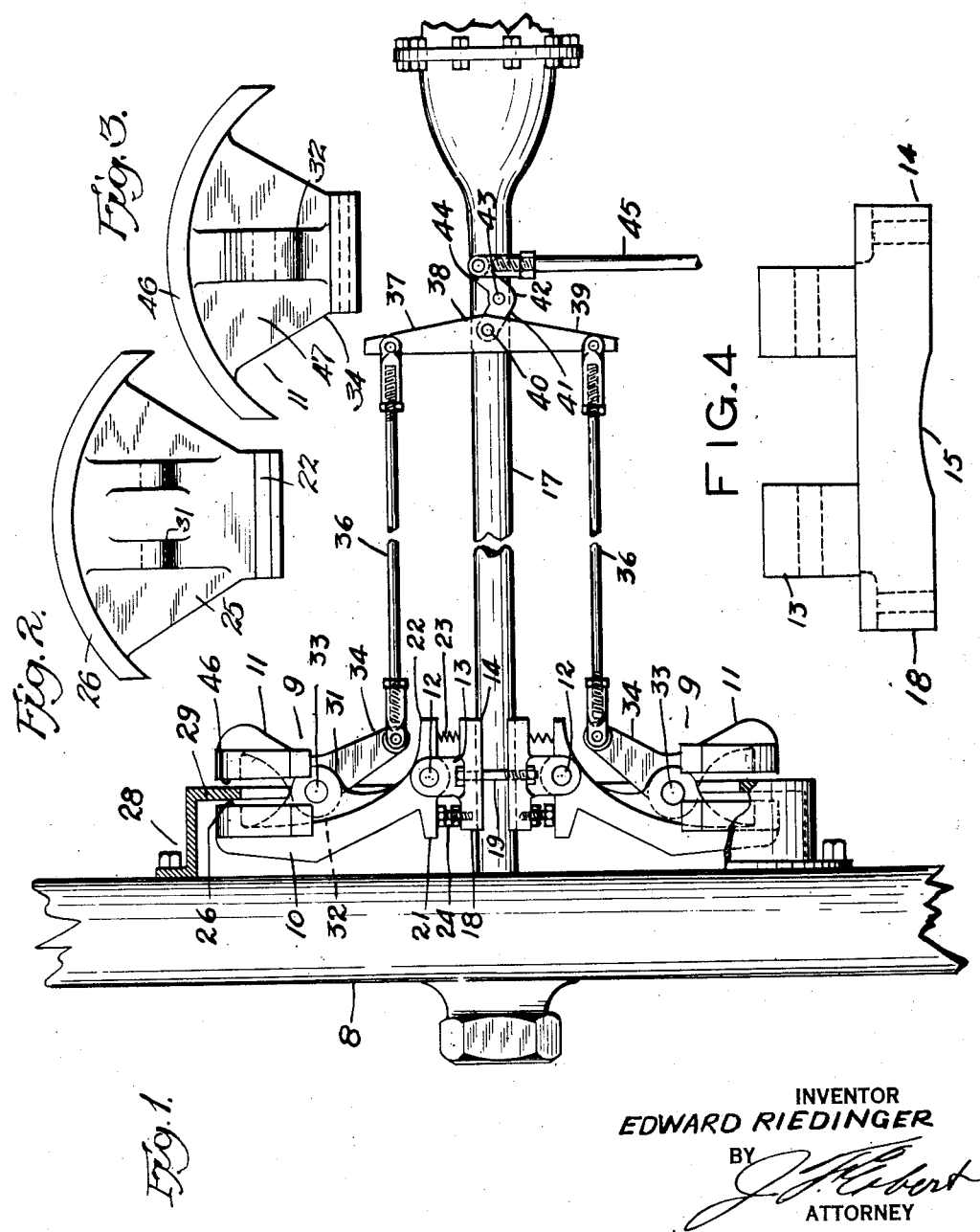
INVENTOR
EDWARD RIEDINGER
BY
ATTORNEY Patented Mar. 1, 1927.

1,619,542

UNITED STATES PATENT OFFICE.

EDWARD RIEDINGER, OF BLOOMFIELD, NEW JERSEY.

BRAKE MECHANISM.

Application filed December 29, 1924. Serial No. 758,523.

The present invention relates to brake mechanism, and more particularly to such mechanisms as employed in connection with motor vehicles.

An object of the invention is to provide a brake mechanism of simple and efficient design and which is operable to retard or terminate the movement of a speedily moving body in a gradual and positive manner within a relatively short time interval.

Another object of the invention is to provide coordinating machine elements operable under moderate force to apply a gradually increasing pressure to a moving body to retard the same or else to bring it to rest.

A further object of the invention is to provide means for terminating or impeding the movement of a body by successively actuating a plurality of contact members.

Other objects of the invention will be apparent as the description is read in connection with the accompanying drawings.

My invention provides for a positive and effective braking action and may comprise a plurality of gripper units having members capable of movement to engage with the brake drums secured to the wheels of a vehicle to bring the latter to rest. The members may be operable from the seat of the vehicle by movement of a lever and my construction includes two members on each unit, each member of a unit being disposed on opposite sides of a flange or brake drum secured to a wheel. In each unit one member is supported by its complemental member, both members being movable through the action of the lever in substantially a sequential order in an increasing pressure gradient. The gripping members may be quickly disengaged from the flange or braking drum by release of the lever.

The invention will be more fully understood by referring to the accompanying drawings in which—

Fig. 1 is a fragmentary plan view partly in section of a vehicle illustrating the application of the present invention to a wheel thereof;

Fig. 2 is an enlarged front view of one of the gripper members or shoes;

Fig. 3 is an enlarged front view of another shoe; and

Fig. 4 is a side view of a bearing block or saddle.

Although the present invention may be used to brake movable bodies of various constructions, the selected embodiment illustrated shows its use as a brake for a motor vehicle, and more particularly as a service brake.

A plurality of gripper units may be employed and, as herein illustrated, two such units are shown applied to a vehicle wheel 8. Inasmuch as the units are of similar construction, a description of one will answer for both.

The invention may comprise one or more pairs of gripper devices or units 9. Each unit may include what may be termed brake shoes or primary and secondary gripper members 10 and 11 respectively. The member 10 carries the member 11 and may be rockable upon a shaft 12 journaled in bearings 13 of a bearing block 14, the latter being suitably secured on a relatively stationary portion of a vehicle structure. In the present embodiment of the invention, the bearing blocks or saddles 14 are provided with concave surfaces 15 (see Fig. 4) to engage with the rear axle housing 17 of a vehicle. The bearing blocks are provided with extensions 18 and may be secured to the housing by disposing the blocks upon opposite sides of the housing and securing them in position by means of bolts 19 extending from the extension of one bearing block and threadedly engaging a nut on the lower side of the other block.

The member 11, which may be termed a carrier member may be provided with oppositely disposed projections 21 and 22, an expansion spring 23 being disposed between the projection 22 and the base portion of the bearing block 14 to normally position the member 11 with the projection 22 in contact with an adjustable stop 24 which may comprise a tap bolt threadedly disposed in the bearing block. The bolt may be locked in any predetermined position of adjustment by a suitable lock nut. The free end of the carrier member 10 may consist of a web 25 (see Fig. 2), terminating in an arcuate gripper or friction face 26 for engagement with a moving body when pressed thereagainst.

The wheel 8 to which my brake devices are applied may be substantially the same as required by standard automotive design, except that the drum 28 may be provided with an inwardly extending flange or friction annulus 29 to be engaged by the gripper units 9.

The member 10 upon which is mounted the carrier member 11, is in the nature of a compound gripper member and may be provided with a pair of bearings 31, located substantially midway between the ends of the member, to receive a complemental bearing 32 similarly located on the gripper member 11, a pin or pintle 33 being provided to connect the members.

One end 34 of the member 11 is provided with a lever arm which may be pivotally connected to an adjustable link 36 of the turn-buckle type pivotally connected at its opposite end to an arm 37 of a cross-head or equalizing bar 38, the other arm 39 of the bar being connected in like manner to the end 34 of the gripper member 11.

The cross-head 38 may be movably connected at 40 to an arm 41 of a bell crank 42 rockable about a stud 43 threadedly or otherwise fastened to the axle housing 17 of the vehicle. Although a bell crank is shown it is obvious that any other suitable interposed motion translating element may be employed.

The opposite arm 44 of the bell crank may be movably attached to an end of a connecting rod 45, the opposite end of said rod being associated with the usual motion translating mechanism such as a hand lever or foot treadle (not shown).

The member 11 may be provided with a contact or gripping surface 46 at the end of a web-like portion 47. This gripper face is also of arcuate form similar to the face 26 of the member 10.

The contact surfaces of each gripper unit are so disposed as to be normally positioned at opposite sides and in spaced relation to the friction annulus 29 ready for actuation to engage with the annulus to brake the wheel.

In operation the units are actuated simultaneously by reason of their connection to the cross bar 38. When the connecting rod 45 is moved to actuate the bell crank 42 a pull upon the links 36 is effected which in turn tends to produce an oscillation of the gripper units as a whole about the pivots or shaft-fulcrums 12. Owing to the springs 23, however, which oppose such action, motion is imparted to the freely movable gripper members 11, the contact surfaces 46 of which engage with a side of the annulus 29, resulting in an initial braking action to retard the rotation of the wheel. After this action has occurred and a greater force is applied, an additional movement may be given to the connecting rod thus causing the engagement of the friction faces 26 of the gripping members 10 with the opposite side of the annulus.

When all of the gripping or contact members have engaged the annulus or flange, a further movement of the connecting rod will act to operate the units to more firmly grip the flange since each of the gripper members 10 then may be considered as a lever of the second order with its fulcrum point in the shaft 12, thereby increasing the pressure upon the flange by reason of the lever action which tends to press the contact surfaces 26 of the gripper members 10 more firmly into contact with the annulus and also the surfaces 46 of the member 11.

This resultant action from an operation of the present device produces a compound lever movement and thus transmits the applied force with a great effect, even though the applied force be moderate.

It will be noted that although a pincher action or double brake is provided, the elements are so organized that the members of the brake engage successively or sequentially and a gradually increasing force is applied. Furthermore, the opposition to the movement of a body, i. e., the wheel of a vehicle, is so distributed as to overcome the inertia of the load and gently arrest its movement in the absence of jerks or jars which ordinarily attend the braking operation of a moving body, particularly when it is necessary to terminate its movement with rapidity.

The present invention although applicable to many types of machines has great utility when employed as an automobile brake wherein it may function to bring a speedily moving vehicle to a state of rest with a minimum amount of manual effort or discomfiture to an operator.

A further advantage of the present invention resides in the absence of lining such as fibre or other material requiring renewal in relatively short periods. By reason of my construction it is possible to make an effective and desirable brake device by a metal to metal contact. The contact surfaces of the gripper units may be comparatively thick to give long service and may be of softer composition than the flange of the drum, thereby receiving the greater part of the wear resulting in the preservation of the flange or other surface with which they contact.

It will be obvious that if desirable facings of a removable character may be employed on either of the contact surfaces of the gripper members or on the rotating surface, metals of different properties may be used. For example, it is known that cast iron provides a good friction surface or a brass or bronze facing may be used against an iron facing.

Another advantage resulting from my invention is that of permitting the ready assembly and removability of the braking mechanism without removal of the wheels of the vehicle. It is also to be appreciated that if but a slight braking action is desired, the operation of the gripping members 9 only may be had by applying but a slight force upon the foot treadle or hand lever.

Although a preferred embodiment of my invention has been illustrated, it will be obvious to those skilled in the art that modifications may be made therein which fall within the spirit and scope of the appended claims defining my invention.

What is claimed is:

1. A vehicle brake comprising a pivoted gripper member, means for actuating said member, a supplemental gripper member pivotally mounted on said first mentioned member and means for actuating said supplemental member under the action of said first-mentioned member.

2. A vehicle brake comprising a pair of gripper members, one of said members being rockable about a pivot at one end thereof, means for said rockable member for pivotally mounting the other member of said pair so as to permit a bodily movement of said other member with the rockable member and an oscillatory movement in relation thereto.

3. A vehicle brake comprising a primary gripper member rockable about a pivot, a secondary gripper member pivotally mounted on and movable bodily with said primary member and means associated with said secondary member whereby an actuation thereof causes a sequential movement of the members in opposite directions.

4. A vehicle brake comprising a primary contact member having one end pivoted, a gripping face on the free end of said member, means for actuating said member, a secondary contact member pivotally mounted on said primary member and means for causing a successive action of the members.

5. A vehicle brake comprising a plurality of gripping units, each of which includes a pair of pivotally connected gripping members, one of said members being pivoted to a support to permit a movement of said pair of members as a unit, a brake drum and means for actuating said members to cause their successive engagement with the drum, said members operating by reason of their relative movement to gradually increase their degree of contact with said drum.

6. A vehicle brake comprising a brake drum, an oscillatory member pivoted at one end, a brake shoe on said member and normally disposed in operative relation to said drum, a lever member pivoted on said oscillatory member, a brake shoe on said lever member disposed in operative relation to said brake drum, means for associating said lever member with a source of power whereby an actuation of said last-mentioned means effects a successive action of said brake shoes against said drum.

7. A vehicle brake comprising a saddle, means for securing the saddle to a vehicle, an oscillatory member pivoted at one end to said saddle, the opposite end of said oscillatory member terminating in an arcuate gripper-shoe, a brake drum, an annular flange on said drum disposed for engagement by said shoe, a second oscillatory member pivoted to the first mentioned member, an arcuate gripper shoe at an end of said second oscillatory member, motion transmitting means associated with the other end of said second oscillatory member to actuate the members and means for normally maintaining the members from engagement with said flange.

8. A vehicle brake comprising a saddle, means for securing the saddle to a vehicle, an oscillatory member pivoted to one end to said saddle, the opposite end of said oscillatory member terminating in an arcuate gripper-shoe, a brake drum, an annular flange on said drum disposed for engagement by said shoe, a second oscillatory member pivoted to the first mentioned member, an arcuate gripper shoe at an end of said second oscillatory member, motion transmitting means associated with the other end of said second oscillatory member to actuate the members, means for normally maintaining the members from engagement with said flange and means for adjustably limiting the degree of movement of said members away from said flange.

In testimony whereof, I have hereunto subscribed my name this 26th day of December, 1924.

EDWARD RIEDINGER.